(12) United States Patent
Gurciullo (10) Patent No.: US 11,188,047 B2
(45) Date of Patent: Nov. 30, 2021

(54) AUTOMATIC VISUAL AND ACOUSTIC ANALYTICS FOR EVENT DETECTION

(71) Applicant: ExxonMobil Research and Engineering Company, Annandale, NJ (US)

(72) Inventor: Christopher S. Gurciullo, Bangor, PA (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 998 days.

(21) Appl. No.: 15/596,557

(22) Filed: May 16, 2017

(65) Prior Publication Data

US 2017/0357233 A1 Dec. 14, 2017

Related U.S. Application Data

(60) Provisional application No. 62/347,159, filed on Jun. 8, 2016.

(51) Int. Cl.
*G05B 19/048* (2006.01)
*G06N 20/00* (2019.01)
*G06F 16/51* (2019.01)
*G06F 16/61* (2019.01)
*G06F 16/28* (2019.01)
(Continued)

(52) U.S. Cl.
CPC ....... *G05B 19/048* (2013.01); *G05B 23/0218* (2013.01); *G06F 16/2455* (2019.01); *G06F 16/285* (2019.01); *G06F 16/51* (2019.01); *G06F 16/61* (2019.01); *G06N 20/00* (2019.01);
(Continued)

(58) Field of Classification Search
CPC .......... G06N 20/00; G06N 3/08; G06N 7/005; G06N 3/084; G10L 25/51
See application file for complete search history.

(56) References Cited

U.S. PATENT DOCUMENTS 4,558,439 A * 12/1985 Gu/ desen ............. G01S 3/8036
367/127
5,717,456 A 2/1998 Rudt et al.
(Continued)

FOREIGN PATENT DOCUMENTS

CN 102522082 A 6/2012
DE 1628179 A1 * 7/2005 ............. G05B 23/02
(Continued)

OTHER PUBLICATIONS

Tranlsation of EP16281791A1, pp. 1-5 (Year: 2005).*
(Continued)

*Primary Examiner* — Paulinho E Smith
(74) *Attorney, Agent, or Firm* — Glenn T. Barrett (57) ABSTRACT

Systems and methods are provided for detecting events in industrial processes. An acquisition system may include one of a camera and an audio recorder to acquire monitoring data in the form of one of imaging data and acoustic data, respectively. A computer system, may include a machine learning engine and may be programmed to classify the monitoring data under a classifier, quantify, based on the classifier, the monitoring data with at least one quantifier, and detect an event when the at least one quantifier satisfies a predetermined rule corresponding to the at least one quantifier.

9 Claims, 5 Drawing Sheets

(51) Int. Cl.
*G06F 16/2455* (2019.01)
*G05B 23/02* (2006.01)

(52) U.S. Cl.
CPC .............. *G05B 2219/23288* (2013.01); *G05B 2219/36039* (2013.01)

(56) References Cited

U.S. PATENT DOCUMENTS

| | | | |
|---|---|---|---|
| 6,774,806 | B1 | 8/2004 | Bannell et al. |
| 9,811,989 | B2 | 11/2017 | Austin |
| 10,424,048 | B1* | 9/2019 | Calhoun .................. G06K 9/66 |
| 10,602,268 | B1* | 3/2020 | Soto ........................ G10L 15/20 |
| 10,635,973 | B1* | 4/2020 | Dirac ...................... G06N 3/08 |
| 10,643,637 | B2* | 5/2020 | Boulanger ............ G06F 16/635 |
| 10,914,635 | B2 | 2/2021 | Schnaare |
| 2009/0110289 | A1 | 4/2009 | Maggiore et al. |
| 2011/0075851 | A1* | 3/2011 | LeBoeuf ................ H04R 29/00 381/56 |
| 2014/0205116 | A1* | 7/2014 | Smith .................... H04R 3/005 381/122 |
| 2015/0139494 | A1 | 5/2015 | Ishikawa et al. |
| 2015/0278711 | A1* | 10/2015 | Angelov ................ G06N 20/00 706/12 |
| 2016/0277863 | A1* | 9/2016 | Cahill .................... H04R 3/005 |
| 2017/0357233 | A1* | 12/2017 | Gurciullo ................ G06F 16/61 |
| 2018/0165554 | A1* | 6/2018 | Zhang .................. G06K 9/6256 |
| 2020/0005054 | A1* | 1/2020 | Cionca ................. G06K 9/2018 |

FOREIGN PATENT DOCUMENTS

| | | |
|---|---|---|
| EP | 1628179 A1 | 2/2006 |
| JP | 7067101 A | 3/1995 |
| JP | 7078239 A | 3/1995 |
| JP | 7198331 A | 8/1995 |
| JP | 8016234 A | 1/1996 |
| JP | 8219324 A | 8/1996 |
| JP | 9037231 A | 2/1997 |
| JP | 9322151 A | 12/1997 |
| JP | 10042274 A | 2/1998 |
| JP | 10210449 A | 8/1998 |
| JP | 10255059 A | 9/1998 |
| JP | 11284982 A | 10/1999 |
| JP | 11313310 A | 11/1999 |
| JP | 2001022433 A | 1/2001 |
| JP | 2002064811 A | 2/2002 |
| JP | 2006060664 A | 3/2006 |
| JP | 2006270275 A | 10/2006 |
| JP | 2008017259 A | 1/2008 |
| JP | 2008269063 A | 11/2008 |
| JP | 2013210798 A | 10/2013 |
| JP | 2015153342 A | 8/2015 |
| KR | 1335640 B1 | 12/2013 |
| WO | 2014/009064 A1 | 1/2014 |

OTHER PUBLICATIONS

The International Search Report and Written Opinion of PCT/US2017/032876 dated Aug. 1, 2017.
Barriuso Poy, A. et al., "The detector control system of the ATLAS experiment", Institute of Physics Publishing, 2008, vol. 3, No. 5, pp. 2-40.
Thunem, Harald P-J, "Vision-Based Diagnostics—The Vision Tool and Preliminary Case Examples", Sixth American Nuclear Society International Topical Meeting on Nuclear Plant Instrumentation, Control, and Human-Machine Interface Technologies, 2009, Knoxville, Tennessee.
Aderounmu, Femi et al., "Machine Vision Eyes Wider CPI", Chemical Engineering Progress, 1997, vol. 93, Issue 2, pp. 72-79.
Bharati, M.H. et al., "Multivariate Image Analysis for Real-Time Process Monitoring and Control", Industrial & Engineering Chemistry Research, 1998, vol. 37, Issue 12, pp. 4715-4724.

* cited by examiner

AUTOMATIC VISUAL AND ACOUSTIC ANALYTICS FOR EVENT DETECTION

CROSS REFERENCE TO RELATED APPLICATION

This application relates and claims priority to US Provisional Patent Application No. 62/347,159 filed on Jun. 8, 2016, the disclosure of which is incorporated entirely herein by reference.

BACKGROUND

The present disclosure relates to visual and acoustic analytics for event detection. Specifically, the present disclosure relates to automating visual and acoustic analytics for event detection, notification, and control in industrial processes.

Analytics for industrial processes have traditionally been focused on statistical techniques operating on traditional instrument-based process data and comparing such data to a list of specific predetermined patterns to detect events and identify abnormalities. Instruments connected to computers or data acquisition systems are placed in, on, or around pieces of equipment to measure and record process data such as temperature, pressure, and flow rate. In some cases, cameras are used to capture thermal images. One instrument is typically associated with one measurement. The recorded data are analyzed, sometimes manually, to identify events based on patterns that are pre-specified by experts/operators of the pieces of equipment. For example, an event may be detected if the temperature from a temperature sensor or a thermal image exceeds a predetermined value. Oftentimes, these instruments are not networked, and data recorded by an instrument is only available by a person physically inspecting the instrument.

However, the list of predetermined patterns is limited to the operators' expertise/knowledge and to the type of data being recorded. As such, abnormalities that are unknown to the operators and that are not captured by the recorded data may be left unnoticed. Often, analyses of the recorded data are not done in real or near-real time, and detected abnormalities are not remedied in a timely fashion. Moreover, unless a newly uncovered abnormality is expressly or manually added to the list of predetermined patterns, the abnormality may not necessarily be detected if it were to reoccur. Additionally, installing sensors and any related wiring within existing industrial processes can be intrusive and costly.

In light of the above described drawbacks of traditional data acquisition and analytics, the inventor recognized a need in the art to develop alternative event detection techniques that overcome or improve upon such limitations.

DETAILED DESCRIPTION

As discussed in the background section, conventional data acquisition and analytics for industrial processes have several shortcomings. To address these shortcomings, embodiments of the present disclosure provide low-cost real-time mechanisms to visually or acoustically monitor, identify, analyze, report on, and control ongoing industrial process operations. As will be described below, visual and acoustic analytics may measure and evaluate processes in ways not available with traditional instrumentation. These mechanisms may be used alongside or in place of traditional process measurement techniques.

The present disclosure describes visual and acoustic analytics using inexpensive, easy-to-install commodity cameras and audio recorders (e.g., microphones) to respectively acquire imaging data (i.e., images and/or videos) and acoustic data (i.e., sounds) of industrial processes and storing them in databases. As used herein, "industrial process(es)" includes the process as a whole as well as the applicable process equipment, piping, valves, and any other physical structure associated with the process. An automated process may then compare the acquired imaging and acoustic data to historical imaging and acoustic data, searching for both expected and unexpected patterns or events. Once the events are found, a prioritized list with regions of interest may be highlighted and presented (e.g., via console, email, text, or other electronic communication) to operations staff for review and identification of potential abnormalities. To remedy the abnormalities, the automated process may also generate control signals to directly control pieces of equipment, without the operations staff's involvement.

The automated process may further include a machine learning algorithm, which may be enhanced over time using feedback from the operations staff and/or the pieces of equipment being controlled. For example, the machine learning algorithm may adapt the event detection, alerting, and control protocols of the automated process based on the feedback. Thus, over time, the automated process may self-identify abnormalities, without requiring an expert to pre-specify what to look for. Alternatively, the algorithm may learn normal and abnormal behaviors by analyzing historical patterns, without any feedback from the operations staff.

In addition, the raw collected imaging and acoustic data may be stored in historical databases to provide the ability to retroactively query the databases based on current needs, rather than the needs identified when the automated process was developed. For example, historizing temperature provides a very narrow window into the past, but images/videos and sounds store much more and can be used for a variety of purposes in the future—many of which might not have been thought of at the time of development. For instance, imaging data or acoustic data are not limited to a specific piece of equipment, one component of a piece of equipment, or a specific physical attribute of a piece of equipment. Rather, imaging data from one camera or acoustic data from one microphone may at once capture information about a plurality of pieces of equipment within an industrial environment. Thus, offline queries may retroactively be made to interrogate historical captured information to search for specific patterns about pieces of equipment that were or were not initially being monitored.

As will be shown below, visual analytics may be applied to problems typically solved with traditional process instruments (such as valve position) and/or to events that can only be determined by visual historical analysis (such as human intrusion into a restricted space or confirmation of lock-out/ tag-out). Moreover, providing clear visual "flags" to an operator reduces the amount of manual analysis required by process staff.

Embodiments of the present disclosure may provide a method for detecting events in industrial processes. The method may comprise the steps of acquiring monitoring data from an acquisition system; classifying the monitoring data under a classifier; quantifying, based on the classifier, the monitoring data with at least one quantifier; and detecting an event when the at least one quantifier satisfies a predetermined rule corresponding to the at least one quantifier.

Embodiments of the present disclosure may provide a system for detecting events in industrial processes. The system may comprise an acquisition system and a computer system. The acquisition system may include one of a camera and an audio recorder to acquire monitoring data in form of one of imaging data and acoustic data, respectively. The computer system may include a machine learning engine and may be programmed to classify the monitoring data under a classifier, quantify, based on the classifier, the monitoring data with at least one quantifier, and detect an event when the at least one quantifier satisfies a predetermined rule corresponding to the at least one quantifier.

Embodiments of the present disclosure may provide a non-transitory machine-readable medium storing instructions adapted to be executed by one or more processors to perform operations to detect events in industrial processes. The operations may comprise the steps of acquiring monitoring data from an acquisition system; classifying the monitoring data under a classifier; quantifying, based on the classifier, the monitoring data with at least one quantifier; detecting an event when the at least one quantifier satisfies a predetermined rule corresponding to the at least one quantifier; analyzing historical data to generate a library of expected events, each of the expected events being associated with one of an alert and a control signal; matching the detected event to one of the expected events; if there is a match, transmitting one of the alert and the control signal; and if there is no match, generating and transmitting another alert.

Figure 1:
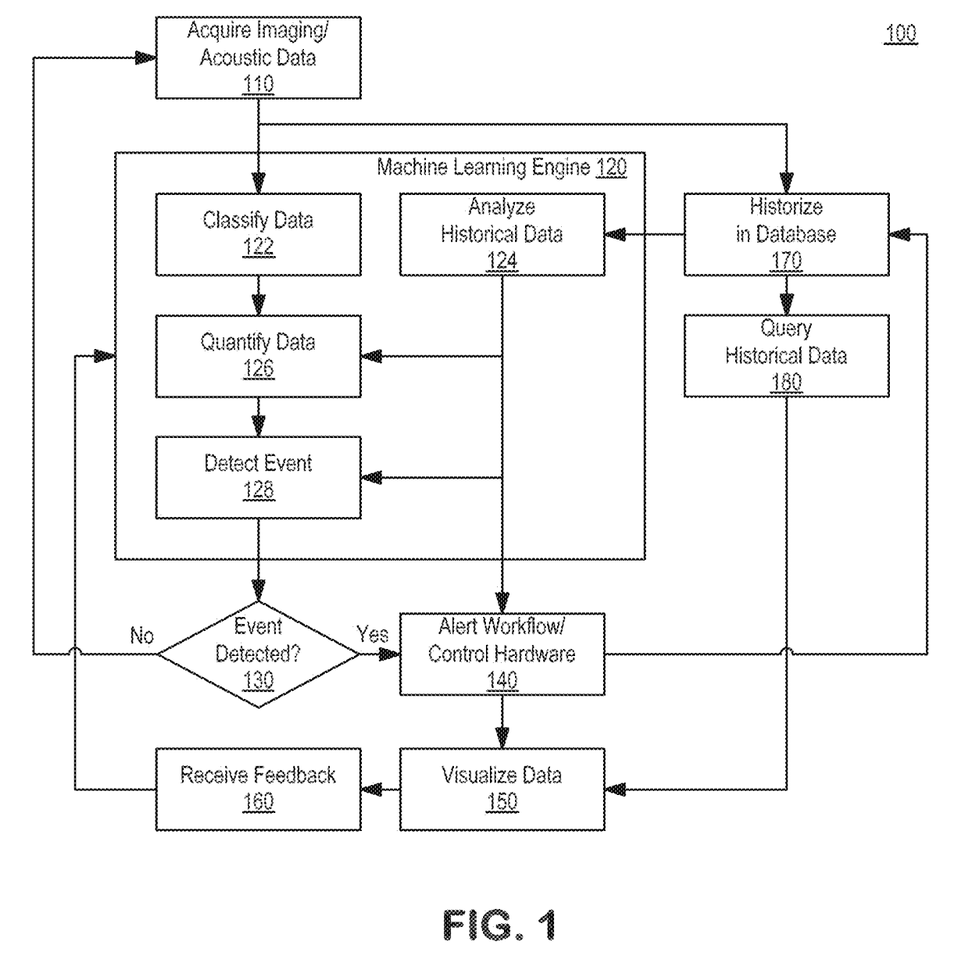
FIG. 1 is a flowchart depicting an event detection method, according to an embodiment of the present disclosure.

FIG. 1 is a flowchart depicting an event detection method 100, according to an embodiment of the present disclosure. The method 100 may be performed by a computer system including one or more processors. The computer system may include storage media, which may comprise secondary or tertiary storage, or one or more databases, to allow for non-volatile or volatile storage of acquired and processed data, and instructions to be executed by the one or more processors. The computer system may also include at least one display unit to display the acquired and/or the processed data to the operations staff. The computer system may be entirely contained at one location or may also be implemented across a closed or local network, a cluster of connected computers, an internet-centric network, or a cloud platform. The method 100 is not limited to any particular programming language or execution environment, and may be applied to any computer programming languages or logic.

The method 100 begins at step 110 by acquiring imaging and/or acoustic data from imaging and/or acoustic hardware, respectively, used to monitor an industrial environment of interest. The imaging hardware may be one or more commodity cameras, along with any required peripherals, capable of taking still images and/or videos of the industrial environment or specific pieces of equipment in the industrial environment, from one or more angles. The acoustic hardware may be one or more commodity audio/voice recorders, along with any required peripherals, capable of recording sounds/noises emitted by machinery within the industrial environment. The imaging and acoustic hardware may be electrically or wirelessly connected to the computer system, and may be installed in fixed or mobile locations throughout the industrial environment. The imaging and acoustic hardware may operate within or beyond the normal human range of sensing (e.g., infrared, ultraviolet, etc.). Hereinafter, the imaging hardware and the acoustic hardware will collectively be referred to as an "acquisition system," and the acquired imaging and/or acoustic data as "monitoring data." From step 110, the method 100 proceeds to a machine learning engine 120.

Using the machine learning engine 120, at step 122, the method 100 classifies the monitoring data under one of a plurality of classifiers. The machine learning engine 120 may include image and acoustic processing algorithms to identify, from the monitoring data, one or more pieces of equipment, one or more components, or one or more characteristics based on which an event may be detected. For example, the machine learning engine 120 may identify components such as, but not limited to, valves, gauges, switches, and indicators from imaging data, and classify the imaging data under such classifiers as "valve," "gauge," "switch," and "indicator," respectively. The machine learning engine 120 may also identify from imaging data restricted spaces such as, but not limited to, lock-out and tag-out spaces. In such cases, the imaging data may be classified under a "movement" classifier to indicate that motion should be restricted from the identified restricted spaces. Imaging data with temperature content may be classified under "thermal" and acoustic data under "acoustic," for example.

At step 124, the machine learning engine 120 analyzes historical data, which may be stored in the storage media, for example. The historical data may contain previously acquired monitoring data, previously detected events, and previously generated alerts and control signals. Using the historical data, the machine learning engine 120 may generate and store a library of statistics, historical patterns, and expected events and their corresponding alerting and control protocols. As will be described, the library may be invoked at different steps of the method 100.

Once the monitoring data is classified in step 122, the method 100 moves to step 126 to quantify the monitoring data with quantifiers. For each classifier associated with imaging and acoustic data, the machine learning engine 120 may utilize algorithms and/or the historical patterns from step 124 to generate one or more graphical and/or numerical quantifiers that may be used to identify/detect an event. FIGS. 2-5 illustrate four examples of how the method 100 quantifies monitoring data with quantifiers.

Figure 2:
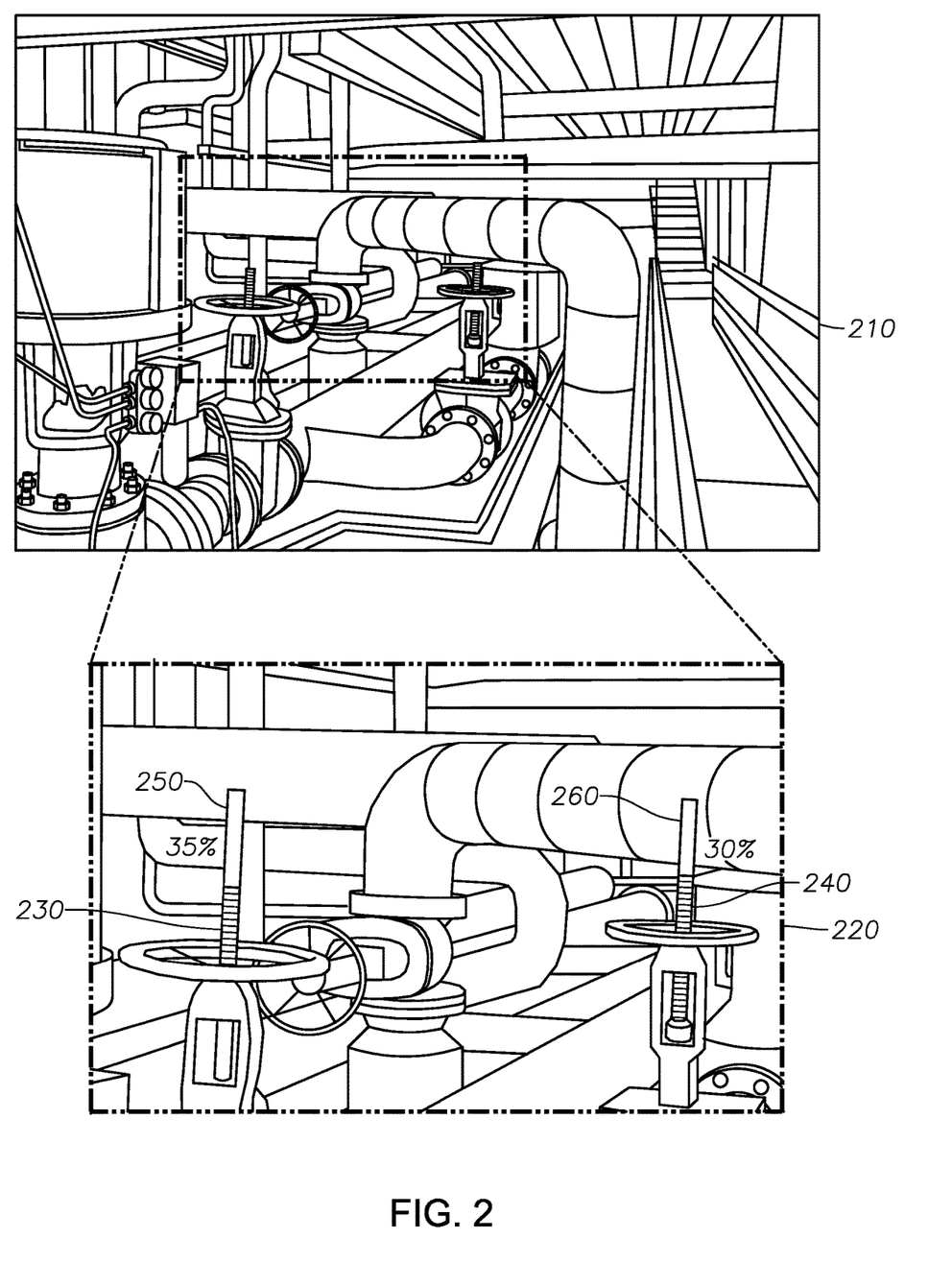
FIG. 2 illustrates an application of the machine learning engine to quantify imaging data containing valves, according to an embodiment of the present disclosure.

FIG. 2 illustrates an application of the machine learning engine 120 to quantify imaging data containing valves, according to an embodiment of the present disclosure. In FIG. 2, the image 210 represents a raw image that, in step 110 of the method 100, may be acquired by a camera installed at a fixed location inside an oil refinery, for example. At step 122, the machine learning engine 120 of the method 100 identifies two valves within the image 210, zooms into the image 210 to provide the image 220, and classifies the image 220 under the "valve" classifier.

Given the "valve" classifier, the machine learning engine 120 then identifies at step 126 the stems of the valves and determines the lengths for those stems and displays them graphically using graphical indicators 230, 240. The graphical indicators 230, 240 may directly be used as quantifiers for the positions of the two valves. Alternatively, the machine learning engine 120 may also generate graphical indicators 250, 260 to indicate allowable ranges of the stems, and calculate ratios or percentages of the graphical indicators 230, 240 relative to the graphical indicators 250, 260 as quantifiers. As shown in FIG. 2, the length of the stem of the left valve is at 35% of its allowable range while the length of the stem of the right valve is at 30%. Informed of such information, along with valve performance information, operations staff of the oil refinery may deduce that the left and right valves are 65% and 70% closed, respectively.

Although the image 210 is shown as a still image, it is to be understood that the image 210 may be just one of a plurality of frames of a video recording, and that the method 100 may repeat the step of quantifying every frame of the video recording as described above.

Figure 3:
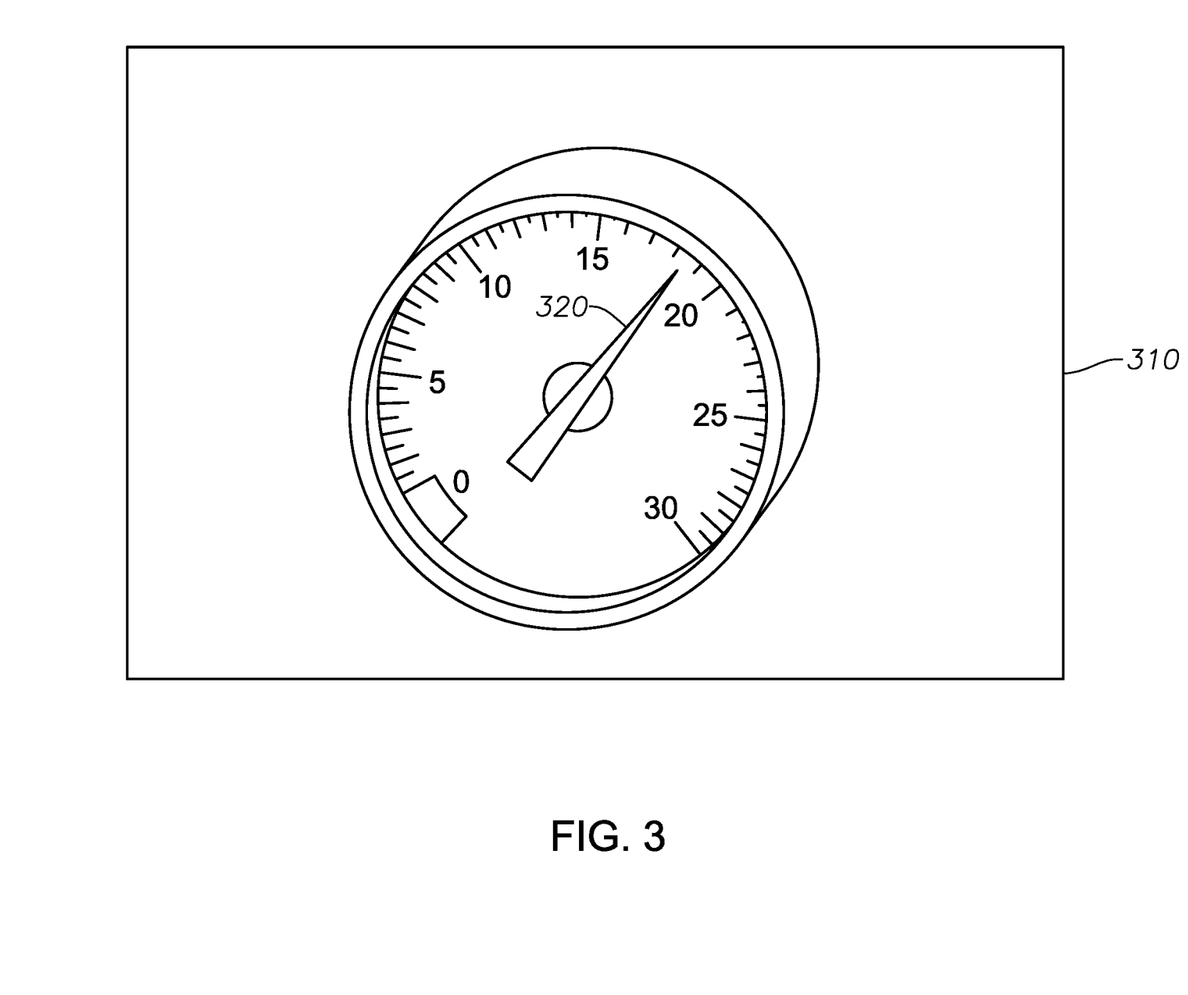
FIG. 3 illustrates an application of the machine learning engine to quantify imaging data containing a gauge, according to an embodiment of the present disclosure.

FIG. 3 illustrates an application of the machine learning engine 120 to quantify imaging data containing a gauge, according to an embodiment of the present disclosure. In particular, FIG. 3 illustrates a frame 310 of a video recording a pressure gauge. The video recording represents imaging data that may be acquired in step 110 of the method 100. At step 122, the machine learning engine 120 classifies the video recording under the "gauge" classifier. At step 126, the machine learning engine 120 detects the needle of the gauge and generates a graphical indicator 320. The position or the angle of the graphical indicator 320 may be used as a quantifier for the pressure measured by the gauge. As the machine learning engine 120 tracks the angle of the graphical indicator 320 from frame to frame of the video recording, the measured pressure may be monitored in real or near-real time.

Figure 4:
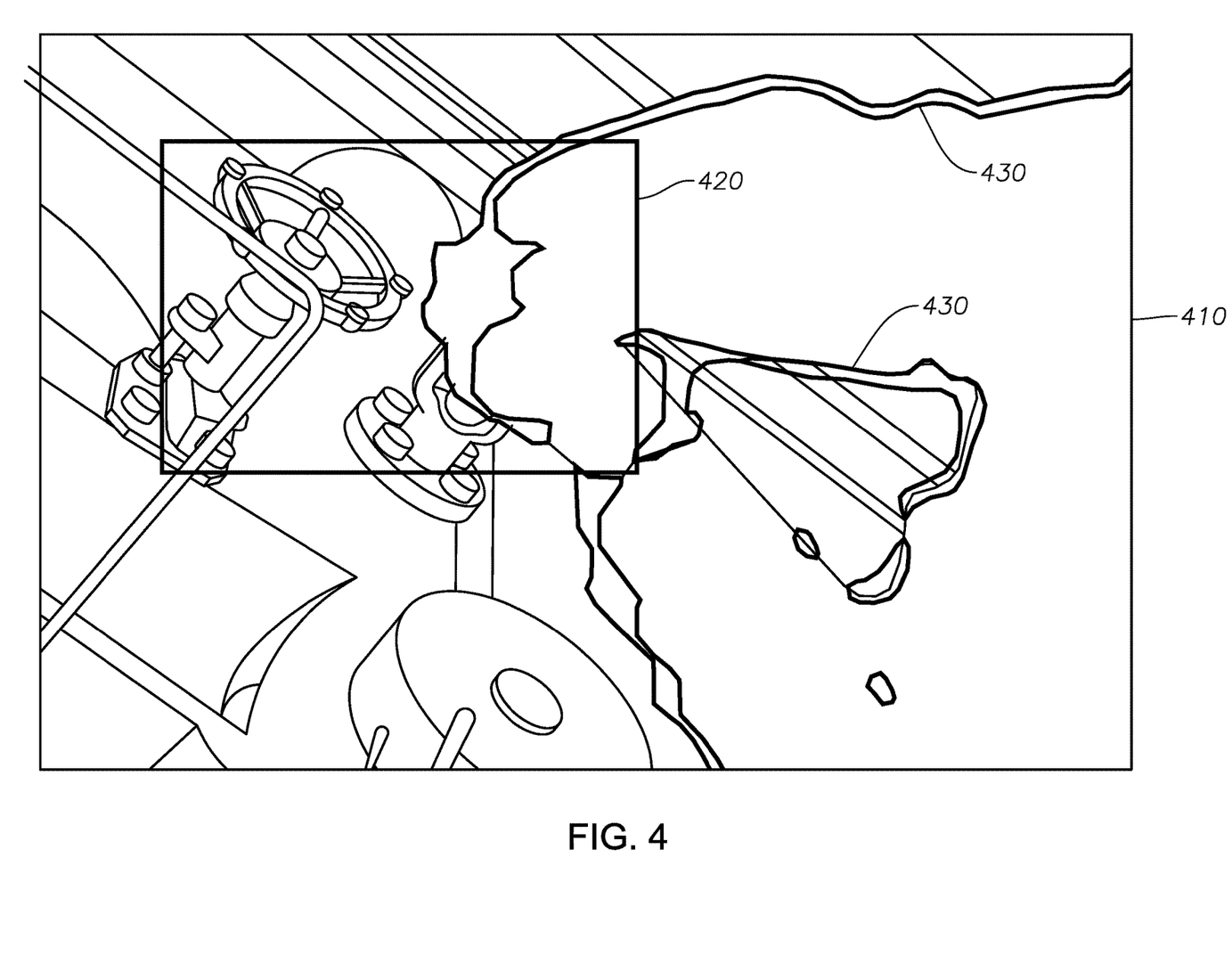
FIG. 4 illustrates an application of the machine learning engine to quantify imaging data containing movement within a restricted space, according to an embodiment of the present disclosure.

FIG. 4 illustrates an application of the machine learning engine 120 to quantify imaging data containing movement within a restricted space, according to an embodiment of the present disclosure. FIG. 4 illustrates a frame 410 of a video recording containing a restricted space 420, which may be identified by the machine learning engine 120 and classified under the "movement" classifier at step 122 of the method 100. At step 126, the machine learning engine 120 generates contours 430 to identify motion within the frame 410. In this example, intrusion of the contours 430 within the restricted space 420 may be used as a quantifier. Additionally, the duration of the intrusion may be used as a quantifier.

Figure 5:
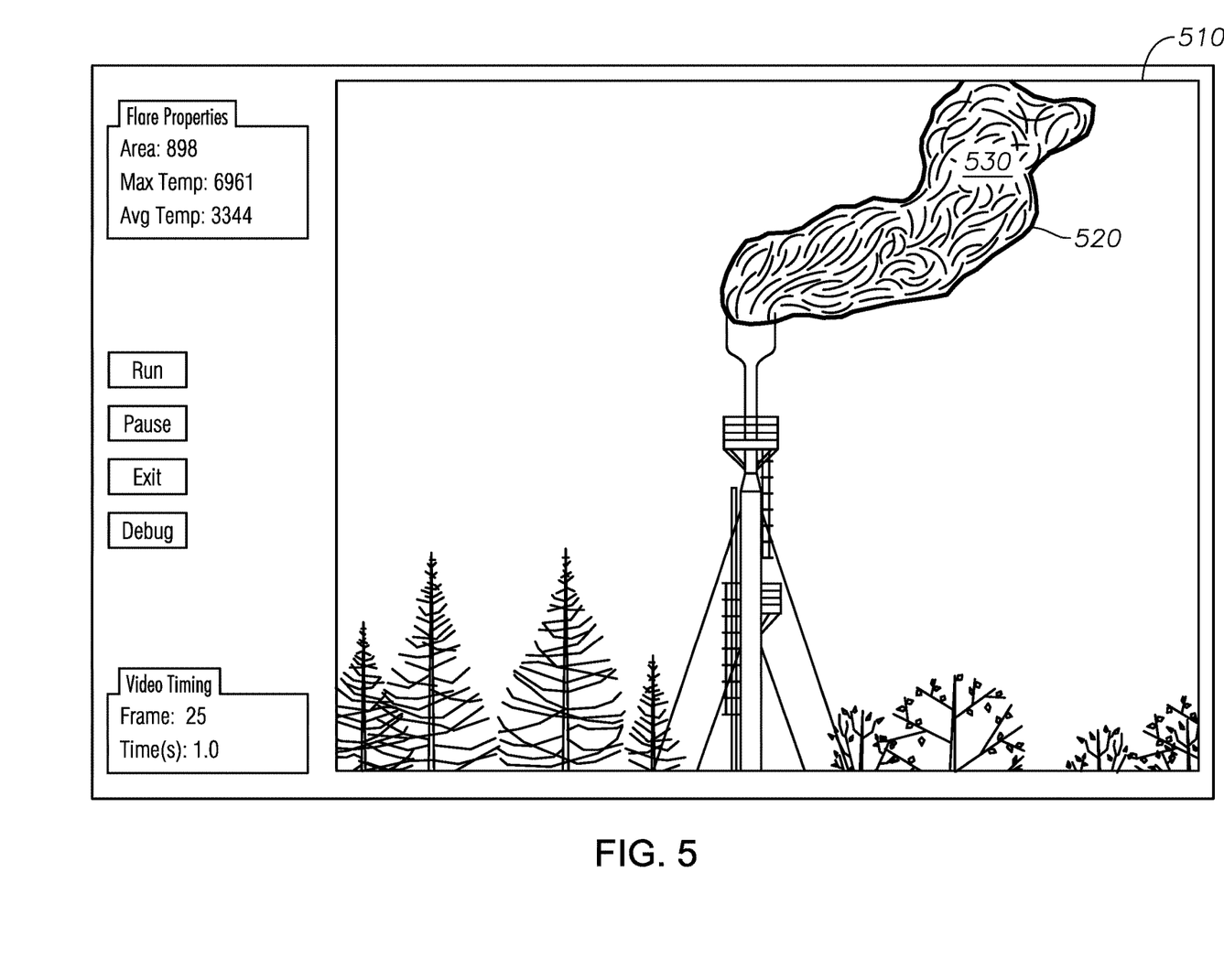
FIG. 5 illustrates an application of the machine learning engine to quantify imaging data with thermal content, according to an embodiment of the present disclosure.

FIG. 5 illustrates an application of the machine learning engine 120 to quantify imaging data with thermal content, according to an embodiment of the present disclosure. In particular, FIG. 5 illustrates a frame 510 of a video recording of an oil refinery. At step 122, the machine learning engine 120 identifies the flare of the oil refinery and classifies the video recording under the "thermal" classifier. At step 126, the machine learning engine 120 generates a contour 520 around the flare and calculates quantifiers 530. In this example, the quantifiers 530 include the area, the maximum temperature, and the average temperature of the flare.

For acoustic data acquired in step 110 of the method 100, the machine learning engine 120 may identify, in the acoustic data, patterns corresponding to specific pieces of equipment at step 122. For example, pumps and compressors may be identified based on their unique acoustic identity, which may be known a priori from experimentation, for example.

At step 126, the machine learning engine may compute, from the acoustic data, quantifiers such as frequency spectrums, amplitudes, etc.

After one or more quantifiers are computed in step 126, the method 100 moves to step 128. At step 128, based on quantifiers and predetermined protocols/rules, and informed by the historical data analysis of step 124, the machine learning engine 120 may identify/detect at least one event. For example, for image data classified under the "valve" classifier, a predetermined protocol may be that an event is detected when the length of the stem is above or below a prescribed threshold. For image data classified under the "gauge" classifier, an event may be detected when the angle of the needle is above or below a prescribed threshold. For image data classified under the "movement" classifier, an event may be detected when motion is detected within a restricted space. For image data classified under the "thermal" classifier, an event may be detected when the maximum or average temperature is above or below a prescribed threshold. It is to be appreciated that, for each classifier, there may be more than one quantifier that may be used to detect an event. For example, for the image data classified under the "thermal" classifier in FIG. 5, aside from the average and maximum temperature quantifiers, an event may be detected when the area of the flare is above or below a prescribed threshold. For acoustic data, an event may be detected when a frequency in a frequency spectrum or an amplitude is above or below a prescribed threshold. Optionally, the method 100 may identify a range of events and associate each event with a probability of being true.

At step 130, the method 100 checks whether at least one event has been detected by the machine learning engine 120. If no event was detected, the method 100 moves back to step 110 to acquire new monitoring data, and repeats steps 122 through 128. If at least one event was detected, the method 100 moves to step 140 and invokes the library of expected events and the corresponding alerting and control protocols from step 124. If the detected event matches one of the expected events, the method 100 alerts workflow or control a piece of hardware using the historical alerting or control protocols. Otherwise, the method 100 alerts the operations staff, via console, email, text, or other electronic communication, of the unexpected detected event and provides the operations staff with descriptive text and supporting images with regions of interest highlighted or specific portions of acoustic data for review and identification of potential abnormalities.

Once alerted, the method 100 allows the operations staff to visualize and analyze the relevant monitoring data at step 150, via the at least one display unit of the computer system, for example. Additionally, at step 150, the method 100 allows the operations staff to visualize historical data queried from the storage media. The operations staff thus may study similar past events, deduce whether the detected event is an abnormality, and understand how the past events were remedied.

At step 160, the method 100 optionally receives feedback from the operations staff and/or the pieces of equipment being controlled. The feedback may include information about at least one of whether an expected or unexpected detected event is an abnormality, whether the abnormality has been remedied, and the steps taken to remedy the abnormality. The method 100 then provides the received feedback to the machine learning engine 120. Based on the feedback from step 160 and/or statistical historical analysis from step 124, the machine learning engine 120 may adapt and augment its event detection, alerting, and control protocols. Thus, over time, the machine learning engine 120 may self-identify abnormalities.

At step 170, the method 100 augments the historical data stored in the storage media by historizing the monitoring data from step 110 and any corresponding alerts (text and/or images as described above) or control signals generated at step 140. The method 100 historizes the monitoring data based on at least one of: the type/format of data acquired, the timestamp of the monitoring data, the location of the acquisition system, and the piece(s) of equipment or components being monitored. The augmented historical data resulting from step 170 is made available to the machine learning engine 120 for analysis of subsequent monitoring data.

At step 180, the method 100 allows for the historical data from step 170 to be queried, by operations staff, for example. The historical data may be retroactively queried based on current needs, rather than the needs identified when the method 100 was developed. The queried historical data may be visualized at step 150. Thus, operations staff may review, analyze, and visualize historical imaging and/or acoustic data to better understand an industrial process or identify events or patterns that may have been overlooked in the past. Once again, the operations staff may provide feedback through step 160 to the machine learning engine 120, thereby enhancing its event detection capabilities.

ADDITIONAL EMBODIMENTS

Embodiment 1

A method, comprising: acquiring monitoring data from an acquisition system; classifying the monitoring data under a classifier; quantifying, based on the classifier, the monitoring data with at least one quantifier; and detecting an event when the at least one quantifier satisfies a predetermined rule corresponding to the at least one quantifier.

Embodiment 2

The method of embodiment 1, further comprising associating the event with a probability of being true.

Embodiment 3

The method of any of the previous embodiments, wherein the monitoring data is one of imaging data and acoustic data.

Embodiment 4

The method of any of the previous embodiments, further comprising analyzing historical data to generate a library of expected events, wherein each of the expected events is associated with one of an alert and a control signal.

Embodiment 5

The method of any of the previous embodiments, wherein at least one of the classifying, the quantifying, the detecting, and the analyzing is performed by a machine learning engine operated by a computer system.

Embodiment 6

The method of any of the previous embodiments, further comprising, when an event is detected: matching the detected event to one of the expected events; if there is a match, transmitting one of the alert and the control signal; and if there is no match, generating and transmitting another alert.

Embodiment 7

The method of any of the previous embodiments, wherein one of the alert and the another alert is transmitted to an operator of an equipment related to the detected event.

Embodiment 8

The method of any of the previous embodiments, further comprising adapting protocols of the machine learning engine based on a feedback from the operator.

Embodiment 9

The method of any of the previous embodiments, wherein the control signal is transmitted to a controllable equipment related to the detected event.

Embodiment 10

The method of any of the previous embodiments, further comprising, augmenting the historical data by: historizing the acquired monitoring data; and when an event is detected, historizing the detected event, associating the detected event with the acquired monitoring data; if there is a match, historizing one of the alert and the control signal, and associating one of the alert and the control signal with the detected event, and if there is no match, historizing the another alert, and associating the another alert with the detected event.

Embodiment 11

A system, comprising: an acquisition system to acquire monitoring data; and a computer system including a machine learning engine programmed to: classify the monitoring data under a classifier; quantify, based on the classifier, the monitoring data with at least one quantifier; and detect an event when the at least one quantifier satisfies a predetermined rule corresponding to the at least one quantifier.

Embodiment 12

The system of embodiment 11, wherein the acquisition system includes a camera and the monitoring data is imaging data.

Embodiment 13

The system of any of embodiments 11-12, wherein the acquisition system includes an audio recorder and the monitoring data is acoustic data.

Embodiment 14

The system of any of embodiments 11-13, wherein machine learning engine is further programmed to analyze historical data stored in a database to generate a library of expected events, wherein each of the expected events is associated with one of an alert and a control signal.

Embodiment 15

The system of any of embodiments 11-14, wherein, when an event is detected, the computer system is programmed to:

match the detected event to one of the expected events; if there is a match, transmit one of the alert and the control signal; and if there is no match, generate and transmit another alert.

Embodiment 16

The system of any of embodiments 11-15, wherein the computer system is programmed to transmit one of the alert and the another alert to an operator of an equipment.

Embodiment 17

The system of any of embodiments 11-16, wherein the computer system is programmed to transmit the control signal to a controllable equipment.

Embodiment 18

The system of any of embodiments 11-17, wherein the computer system is further programmed to augment the historical data in the database by: historizing the acquired monitoring data; and when an event is detected, historizing the detected event, associating the detected event with the acquired monitoring data; if there is a match, historizing one of the alert and the control signal, and associating one of the alert and the control signal with the detected event, and if there is no match, historizing the another alert, and associating the another alert with the detected event.

Embodiment 19

The system of any of embodiments 11-18, wherein the computer system is further programmed to: query the historical data from the database; and display the queried data on a display unit to allow for identification of unexpected events.

Embodiment 20

A non-transitory machine-readable medium storing instructions adapted to be executed by one or more processors to perform operations comprising: acquiring monitoring data from an acquisition system; classifying the monitoring data under a classifier; quantifying, based on the classifier, the monitoring data with at least one quantifier; detecting an event when the at least one quantifier satisfies a predetermined rule corresponding to the at least one quantifier; analyzing historical data to generate a library of expected events, wherein each of the expected events is associated with one of an alert and a control signal; matching the detected event to one of the expected events; if there is a match, transmitting one of the alert and the control signal; and if there is no match, generating and transmitting another alert.

Embodiments of the disclosure are specifically illustrated and/or described herein. However, it is to be appreciated that modifications and variations of the disclosure are covered by the above teachings and within the purview of the appended claims without departing from the spirit and intended scope of the disclosure. Further variations that are consistent with the principles described above are permissible.

The invention claimed is:

1. A method for automatic visual analytic detection of events for an industrial environment, comprising:
acquiring visual monitoring data from an acquisition system for the industrial environment of interest, wherein the monitoring data is imaging data;
analyzing historical data to generate a library of expected events, wherein each of the expected events is associated with one of an alert and a control signal;
identifying a relevant portion of the visual monitoring data;
classifying the relevant portion of the visual monitoring data under a classifier utilizing a machine learning engine operated by a computer system, wherein the classifier classifies at least one of thermal content and movement;
quantifying, based on the classifier, the visual monitoring data with at least one quantifier utilizing the machine learning engine operated by the computer system;
detecting utilizing the machine learning engine operated by the computer system an event when the at least one quantifier satisfies a predetermined rule corresponding to the at least one quantifier,
wherein when an event is detected, matching the detected event to one of the expected events in the library of expected events, wherein if there is a match, transmitting one of the alert and the control signal, and wherein if there is no match, generating and transmitting another alert; and
augmenting the historical data by historizing the acquired visual monitoring data,
wherein when an event is detected, historizing the detected event, and associating the detected event with the acquired visual monitoring data,
wherein if there is a match, historizing one of the alert and the control signal, and associating one of the alert and the control signal with the detected event, and
wherein if there is no match, historizing the another alert, and associating the another alert with the detected event.

2. The method of claim 1, further comprising associating the event with a probability of being true.

3. The method of claim 1, wherein one of the alert and the another alert is transmitted to an operator of an equipment related to the detected event.

4. The method of claim 3, further comprising adapting protocols of the machine learning engine based on a feedback from the operator.

5. The method of claim 1, wherein the control signal is transmitted to a controllable equipment related to the detected event.

6. A system for automatic visual analytic detection of events for an industrial environment, comprising:
an acquisition system to acquire visual monitoring data, wherein the acquisition system includes at least one of a camera, wherein the visual monitoring data is imaging data; and
a computer system including a machine learning engine programmed to:
identify a relevant portion of the visual monitoring data;
classify the relevant portion of the visual monitoring data under a classifier, wherein the classifier classifies at least one of thermal content and movement;
analyze historical data stored in a database to generate a library of expected events, wherein each of the expected events is associated with one of an alert and a control signal;
quantify, based on the classifier, the visual monitoring data with at least one quantifier;

detect an event when the at least one quantifier satisfies a predetermined rule corresponding to the at least one quantifier, wherein when an event is detected, match the detected event to one of the expected events, wherein if there is a match, transmit one of the alert and the control signal, and wherein if there is no match, generate and transmit another alert; and augment the historical data in the database by historizing the acquired visual monitoring data, wherein when an event is detected, historizing the detected event, associating the detected event with the acquired visual monitoring data;

wherein if there is a match, historizing one of the alert and the control signal, and associating one of the alert and the control signal with the detected event, and wherein if there is no match, historizing the another alert, and associating the another alert with the detected event.

7. The system of claim 6, wherein the computer system is programmed to transmit one of the alert and the another alert to an operator of an equipment.

8. The system of claim 6, wherein the computer system is programmed to transmit the control signal to a controllable equipment.

9. The system of claim 6, wherein the computer system is further programmed to:
  query the historical data from the database; and
  display the queried data on a display unit to allow for identification of unexpected events.

* * * * *